United States Patent

Obara et al.

[11] Patent Number: 6,050,728
[45] Date of Patent: *Apr. 18, 2000

[54] COMPOUND BALL BEARING TYPE PULLEY

[75] Inventors: Rikuro Obara; Katashi Tatsuno, both of Nagano-ken, Japan

[73] Assignee: Minebea Kabushiki-Kaisha, Nagano-ken, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/688,009

[22] Filed: Jul. 29, 1996

Related U.S. Application Data

[63] Continuation-in-part of application No. 08/131,400, Oct. 5, 1997, Pat. No. 5,560,717.

[30] Foreign Application Priority Data

Oct. 7, 1992 [JP] Japan .................................... 4-293858
Nov. 9, 1992 [JP] Japan .................................... 4-323646

[51] Int. Cl.[7] .................................................... F16C 19/10
[52] U.S. Cl. ............................ 384/613; 384/512; 384/547
[58] Field of Search .................................... 384/512, 613, 384/544, 617, 547

[56] References Cited

U.S. PATENT DOCUMENTS

| | | |
|---|---|---|
| 4,408,808 | 10/1983 | Redmann, Jr. et al. . |
| 4,607,182 | 8/1986 | Ballhaus .................................... 384/512 |
| 4,713,704 | 12/1987 | Voll et al. . |
| 5,013,947 | 5/1991 | Ide . |
| 5,045,738 | 9/1991 | Hishida et al. . |
| 5,048,982 | 9/1991 | Nakanishi .................................... 384/613 |
| 5,051,004 | 9/1991 | Takeuchi et al. .................................... 384/512 |
| 5,141,088 | 8/1992 | Kurihara et al. .................................... 384/512 |
| 5,207,701 | 5/1993 | Ishikawa et al. .................................... 384/544 |

FOREIGN PATENT DOCUMENTS

| | | |
|---|---|---|
| 3224448 | 2/1983 | Germany . |
| 3540363 | 6/1986 | Germany . |

OTHER PUBLICATIONS

Japanese Abstract No. 58–160322, vol. 9, No. 182 (P. 376) (1905), Jul. 27, 1985.
Japanese Abstract No. 63255869, vol. 13, No. 70 (P. 829), Feb. 2, 1989.
Japanese Abstract No. 61–224836, Oct. 6, 1986, Kazuaki Nakamaori.

*Primary Examiner*—Lenard A. Footland
*Attorney, Agent, or Firm*—Lowe Hauptman Gopstein Gilman & Berner

[57] ABSTRACT

A compound ball bearing type pulley comprises a bearing assembly including a spindle 1, a sleeve 2 surrounding the spindle 1 with outer flanges 22a, 22b formed on upper and lower ends of the sleeve and an inner ring fitted on the spindle. Balls 5, 9 are provided and between the spindle 1 and sleeve 2, between the inner ring 6 and sleeve 2. Conventional outer rings are not necessary and the outer diameter of the pulley can be made smaller.

16 Claims, 1 Drawing Sheet

F I G. 1
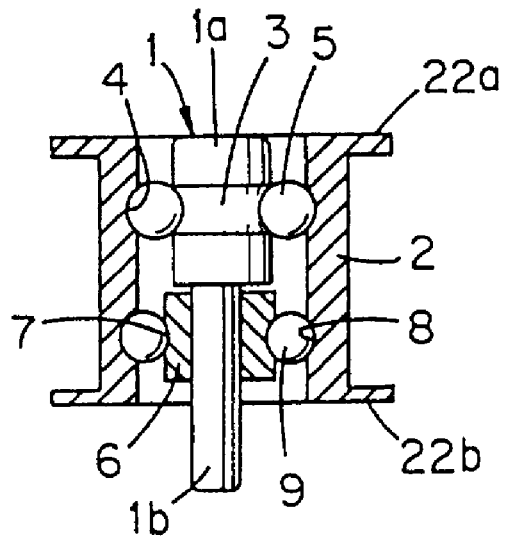

COMPOUND BALL BEARING TYPE PULLEY

This application is a continuation-in-part of application Ser. No. 08/131,400, filed Oct. 5, 1997, now U.S. Pat. No. 5,560,717, issued Oct. 1, 1996, the contents of which are hereby incorporated by reference.

BACKGROUND OF THE INVENTION

1. Field of the Invention

This invention relates to a compound ball bearing type pulley mainly used for office automation apparatuses.

2. Description of the Prior Art

A usual pulley used for office automation apparatuses, as shown in FIG. 2, comprises a spindle 31, a pair of conventional ball bearings 32, 32 mounted on the spindle 31 and a sleeve 33 having outer flanges 34, 35 which serve as rims of the pulley on its upper and lower end.

The conventional ball bearing 32 has an inner ring 36, an outer ring 37 and balls 38.

SUMMARY OF THE INVENTION

An object of the present invention is to reduce the serial no. size of the outer diameter of the pulley.

A compound ball bearing type pulley according to the invention compuses a bearing assembly including a stepped spindle having a large diameter portion and a small diameter portion, a sleeve surrounding said spindle, the sleeve having outer flanges on its upper end and lower end, said large diameter portion of said spindle formed with an outer race for one row of balls, balls in said one row being provided between said outer race and an inner race formed in said sleeve, and an inner ring fitted on the small diameter portion of said spindle and having an outer race, balls in another row being provided between said outer race of said inner ring and a corresponding inner race formed in said sleeve.

BRIEF DESCRIPTION OF THE DRAWINGS

FIG. 1 is a sectional view showing an embodiment of the compound ball bearing type pulley of the present invention;

DESCRIPTION OF THE PREFERRED EMBODIMENT

Figure 2:
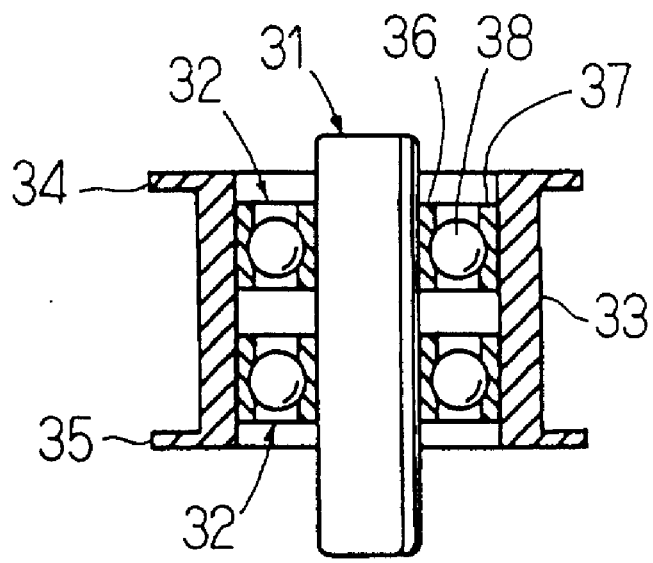
FIG. 2 is a sectional view showing a conventional pulley.

Now, the invention will be described in conjunction with an embodiment thereof illustrated in the drawing.

FIG. 1 shows an embodiment of the compound ball bearing type pulley according to the invention. Referring to the Figure, there is shown a double-row ball bearing, in which a spindle 1 and a sleeve 2 corresponding thereto an serving as an outer ring form a bearing assembly for retaining bearing balls provided in two rows.

The spindle 1 is stepped and has a large diameter portion 1a and a small diameter portion 1b. The large diameter portion 1a has an outer race 3 for one row of balls, while the sleeve 2 has an inner race 4 corresponding to the outer race 3 of the spindle. Balls 5 in one row are provided between the outer race 3 of the spindle 1 and the inner race 4 of the sleeve 2.

On the small diameter portion of the spindle, an inner ring 6 is fitted, and balls 9 in another row are provided between an outer race 7 formed in the inner ring 6 and a corresponding inner race 8 formed in the sleeve.

Outer flanges 22a, 22b are formed on the upper and lower end of the sleeve 2. The outer flanges serve as rims of the pulley.

In this embodiment, the inner ring 6 is fitted loosely on the spindle and set in a proper position with a pre-load applied from its end face. Then the ring is secured to the spindle by using an adhesive.

Each ball 5, 9 is suitably made of high carbon chromium bearing steel.

According to the invention, since the sleeve 2 of the pulley has inner races 4, 8 directly in its inner periphery the conventional outer rings are not necessary. Therefore, the outer diameter of the sleeve can be made smaller and it is possible to provide a smaller pulley.

What is claimed is:

1. A compound ball bearing type pulley comprising:

a bearing assembly including a stepped spindle (1) having a large diameter portion (1a) and a small diameter portion (1b), a sleeve (2) surrounding said spindle (1), the sleeve having outer flanges (22a), (22b) on its upper end and on its lower end, said large diameter portion (1a) of said spindle. (1) having an outer race (3) for one row of balls, balls (5) in said one row being provided between said outer race (3) and an inner race (4) directly formed in the inner surface of said sleeve (2), and an inner ring (6) fitted on the small diameter portion (1b) of said spindle (1) and having an outer race (7), balls (9) in another row being provided between said outer race (7) of said inner ring and a corresponding inner race (8) directly formed in the inner surface of said sleeve (2).

2. A pulley in accordance with claim 1, comprising only said inner ring (6) around said small diameter portion of said spindle, said inner race (8) directly formed in the inner surface of said sleeve eliminating any requirement for a concentric outer race ring for said balls (9) in said outer race (7) of said inner ring (6) fitted on the small diameter portion (1b) of said spindle of said bearing assembly, said bearing assembly of said pulley thereby being free of said concentric outer race ring around said small diameter portion of said spindle.

3. A pulley in accordance with claim 1, wherein said inner race (4) directly formed in the inner surface of said sleeve eliminates any requirement for a concentric outer race ring for said balls (5) in said outer race (3) of said large diameter portion (1a) of said bearing assembly, said bearing assembly of said pulley thereby being free of said concentric outer race ring around said large diameter portion of said spindle.

4. A pulley in accordance with claim 3, comprising only said inner ring (6) around said small diameter portion of said spindle, said inner race (8) directly formed in the inner surface of said sleeve eliminating any requirement for a concentric outer race ring for said balls (9) in said outer race (7) of said inner ring (6) fitted on the small diameter portion (1b) of said spindle of said bearing assembly, said bearing assembly of said pulley thereby being free of said concentric outer race ring around either of said small diameter portion and said large diameter portion of said spindle.

5. A pulley as recited in claim 1 further including pulley rims, said pulley rims comprising said outer flanges of said sleeve.

6. A pulley in accordance with claim 5, comprising only said inner ring (6) around said small diameter portion of said spindle, said inner race (8) directly formed in the inner surface of said sleeve eliminating any requirement for a concentric outer race ring for said balls (9) in said outer race (7) of said inner ring (6) fitted on the small diameter portion (1b) of said spindle of said bearing assembly, said bearing assembly of said pulley thereby being free of said concentric outer race ring around said small diameter portion of said spindle.

7. A pulley in accordance with claim 5, wherein said inner race (4) directly formed in the inner surface of said sleeve eliminates any requirement for a concentric outer race ring for said balls (5) in said outer race (3) of said large diameter portion (1a) of said bearing assembly, said bearing assembly of said pulley thereby being free of said concentric outer race ring around said large diameter portion of said spindle.

8. A pulley in accordance with claim 7, comprising only said inner ring (6) around said small diameter portion of said spindle, said inner race (8) directly formed in the inner surface of said sleeve eliminating any requirement for a concentric outer race ring for said balls (9) in said outer race (7) of said inner ring (6) fitted on the small diameter portion (1b) of said spindle of said bearing assembly, said bearing assembly of said pulley thereby being free of said concentric outer race ring around either of said small diameter portion and said large diameter portion of said spindle.

9. A pulley as recited in claim 1, further including a pair of substantially flat annular pulley rims formed directly on and integral with said sleeve, said pulley rims comprising said outer flanges (22a, 22b), said sleeve providing a single unitary structure incorporating therein said inner race (4), said corresponding inner race (8), and said pulley rims (22a, 22b).

10. A compound ball bearing type pulley comprising:
a bearing assembly and pulley rims;
said bearing assembly including:
a stepped spindle (1) having a large diameter portion (1a) and a small diameter portion (1b);
a sleeve (2) surrounding said spindle (1),
said sleeve (2) having a first inner race (4) facing said large diameter portion (1a) of said spindle (1) and a second inner race (8) facing said small diameter portion (1b) of said spindle (1),
said first and second inner races being directly formed in the inner surface of said sleeve (2) and being integral with said sleeve (2),
said sleeve having outer flanges (22a), (22b) on its upper end and on its lower end;
said large diameter portion (1a) of said spindle (1) having an outer race (3) for one row of balls, balls (5) in said one row being provided between said outer race (3) and said first inner race (4) directly formed in the inner surface of said sleeve (2); and
an inner ring (6) fitted on the small diameter portion (1b) of said spindle (1) and having an outer race (7), balls (9) in another row being provided between said outer race (7) of said inner ring and said second inner race (8) directly formed in the inner surface of said sleeve (2);
said pulley rims comprising said outer flanges of said sleeve.

11. A pulley in accordance with claim 10, comprising only said inner ring (6) around said small diameter portion of said spindle, said inner race (8) directly formed in the inner surface of said sleeve eliminating any requirement for a concentric outer race ring for said balls (9) in said outer race (7) of said inner ring (6) fitted on the small diameter portion (1b) of said spindle of said bearing assembly, said bearing assembly of said pulley thereby being free of said concentric outer race ring around said small diameter portion of said spindle.

12. A pulley in accordance with claim 10, wherein said inner race (4) directly formed in the inner surface of said sleeve eliminates any requirement for a concentric outer race ring for said balls (5) in said outer race (3) of said large diameter portion (1a) of said bearing assembly, said bearing assembly of said pulley thereby being free of said concentric outer race ring around said large diameter portion of said spindle.

13. A pulley in accordance with claim 12, comprising only said inner ring (6) around said small diameter portion of said spindle, said inner race (8) directly formed in the inner surface of said sleeve eliminating any requirement for a concentric outer race ring for said balls (9) in said outer race (7) of said inner ring (6) fitted on the small diameter portion (1b) of said spindle of said bearing assembly, said bearing assembly of said pulley thereby being free of said concentric outer race ring around either of said small diameter portion and said large diameter portion of said spindle.

14. A compound ball bearing type pulley comprising:
a bearing assembly including:
a stepped spindle (1) having a large diameter portion (1a) and a small diameter portion (1b);
a sleeve (2) surrounding said spindle (1),
said sleeve (2) having a first inner race (4) facing said large diameter portion (1a) of said spindle (1) and a second inner race (8) facing said small diameter portion (1b) of said spindle (1),
said first and second inner races being in the inner surface of said sleeve (2) and being integral with said sleeve (2),
said sleeve having outer flanges (22a), (22b) on its upper end and on its lower end;
said large diameter portion (1a) of said spindle (1) having an outer race (3) for one row of balls, balls (5) in said one row being provided between said outer race (3) and said first inner race (4) integral with said sleeve (2); and
an inner ring (6) fitted on the small diameter portion (1b) of said spindle (1) and having an outer race (7), balls (9) in another row being provided between said outer race (7) of said inner ring and said second inner race (8) integral with said sleeve (2).

15. A pulley as recited in claim 14, further including a pair of substantially flat annular pulley rims formed directly on and integral with said sleeve, said pulley rims comprising said outer flanges (22a, 22b), said sleeve providing a single unitary structure incorporating therein said inner race (4), said corresponding inner race (8), and said pulley rims (22a, 22b).

16. A pulley, comprising:
a pair of pulley rims (22a, 22b), and
a compound bearing assembly;
said bearing assembly including:
a stepped spindle (1) having a large diameter portion (1a) and a small diameter portion (1b);
a sleeve (2) surrounding said spindle (1),
said sleeve (2) having a first inner race (4) facing said large diameter portion (1a) of said spindle (1) and a second inner race (8) facing said small diameter portion (1b) of said spindle (1),
said first and second inner races being directly formed in the inner surface of said sleeve (2) and being integral with said sleeve (2) in a unitary one-piece structure, said sleeve having outer flanges (22*a*), (22*b*) formed directly on its upper end and on its lower end and integral with said sleeve as a single one-piece unitary structure;

said large diameter portion (1*a*) of said spindle (1) having an outer race (3) for one row of balls, balls (5) in said one row being provided between said outer race (3) and said first inner race (4) directly formed in the inner surface of said sleeve (2); and an inner ring (6) fitted on the small diameter portion (1*b*) of said spindle (1) and having an outer race (7), balls (9) in another row being provided between said outer race (7) of said inner ring and said second inner race (8) directly formed in the inner surface of said sleeve (2);

said pulley rims comprising said outer flanges of said sleeve, whereby said sleeve provides a single integrated one-piece unitary structure including therein said pulley rims (22*a*, 22*b*) and aid first and second inner races (4, 8).

* * * * *

UNITED STATES PATENT AND TRADEMARK OFFICE
CERTIFICATE OF CORRECTION

PATENT NO. : 6,050,728
DATED : December 29, 1997
INVENTOR(S) : RIKURO OBARA

It is certified that error appears in the above-indentified patent and that said Letters Patent is hereby corrected as shown below:

ON THE TITLE PAGE:
    Item [63] October 5, 1997 should read --October 5, 1993 --.

Signed and Sealed this

Sixth Day of March, 2001

Attest:

NICHOLAS P. GODICI

Attesting Officer    Acting Director of the United States Patent and Trademark Office